US011917109B2

(12) United States Patent
Liu et al.

(10) Patent No.: US 11,917,109 B2
(45) Date of Patent: Feb. 27, 2024

(54) PRINTING APPARATUS

(71) Applicant: BROTHER KOGYO KABUSHIKI KAISHA, Nagoya (JP)

(72) Inventors: Yuqing Liu, Nagoya (JP); Kosuke Mori, Handa (JP); Katsunori Enomoto, Toyokawa (JP); Toyoshi Adachi, Kakamigahara (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/023,807

(22) Filed: Sep. 17, 2020

(65) Prior Publication Data
US 2021/0092244 A1   Mar. 25, 2021

(30) Foreign Application Priority Data

Sep. 20, 2019   (JP) .................................. 2019-171723

(51) Int. Cl.
| | |
|---|---|
| *H04N 1/00* | (2006.01) |
| *G06F 3/04842* | (2022.01) |
| *G06F 3/04855* | (2022.01) |

(52) U.S. Cl.
CPC ..... *H04N 1/00411* (2013.01); *G06F 3/04842* (2013.01); *G06F 3/04855* (2013.01); *H04N 1/00395* (2013.01); *H04N 1/00424* (2013.01)

(58) Field of Classification Search
CPC ........... H04N 1/00411; H04N 1/00424; H04N 1/00395; G06F 3/04842; G06F 3/04855
See application file for complete search history.

(56) References Cited

U.S. PATENT DOCUMENTS

| | | | | |
|---|---|---|---|---|
| 5,880,740 A | * | 3/1999 | Halliday ................. | G06T 11/60 |
| | | | | 345/629 |
| 5,880,768 A | * | 3/1999 | Lemmons ................ | H04N 5/50 |
| | | | | 725/60 |

(Continued)

FOREIGN PATENT DOCUMENTS

| | | |
|---|---|---|
| JP | 2002-344674 A | 11/2002 |
| JP | 2004-096793 A | 3/2004 |

(Continued)

OTHER PUBLICATIONS https://stackoverflow.com/questions/12673786/how-to-select-all-checkbox-inside-a-gridview?rq=1 pp. 1-2 ; Oct. 2012.*

(Continued)

*Primary Examiner* — Sherrod L Keaton
(74) *Attorney, Agent, or Firm* — Scully, Scott, Murphy & Presser, PC

(57) ABSTRACT

A printing apparatus includes a communication interface, a memory, a touch panel, a printer, and a controller. The printer prints an image on a recording medium. The controller is configured to: receive a print job through the communication interface and store the print job in the memory; control the touch panel to display a list including one or more job touch keys and a function touch key, the one or more job touch keys being for individually selecting one or more print jobs stored in the memory, the function touch key being for selecting all of the one or more job touch keys included in the list, the list being scrollable along a particular direction; and in response to receiving a scroll operation of the list, controlling the touch panel to cause the list to scroll along the particular direction.

19 Claims, 8 Drawing Sheets

(56) References Cited

U.S. PATENT DOCUMENTS

| | | | | |
|---|---|---|---|---|
| 6,151,464 | A | * | 11/2000 | Nakamura ......... H04N 1/32122 399/81 |
| 2006/0034630 | A1 | * | 2/2006 | Yabe ..................... G03G 15/50 399/82 |
| 2006/0055968 | A1 | * | 3/2006 | Sato ................... H04N 1/32432 358/1.15 |
| 2007/0277173 | A1 | | 11/2007 | Tokimoto et al. |
| 2009/0031235 | A1 | | 1/2009 | Martin et al. |
| 2010/0103453 | A1 | * | 4/2010 | Tsutsumi .............. G06F 3/1263 358/1.15 |
| 2013/0067396 | A1 | * | 3/2013 | Demopoulos ....... G06F 3/04855 715/786 |
| 2013/0080968 | A1 | * | 3/2013 | Hanson .................. G06F 9/451 715/783 |
| 2015/0009533 | A1 | * | 1/2015 | Anno .................... G06F 3/1255 358/1.15 |
| 2018/0095391 | A1 | | 4/2018 | Hattori |
| 2018/0181352 | A1 | | 6/2018 | Saito |

FOREIGN PATENT DOCUMENTS

| | | |
|---|---|---|
| JP | 2007-318360 A | 12/2007 |
| JP | 2010-205155 A | 9/2010 |
| JP | 2010-208155 A | 9/2010 |
| JP | 2012-181589 A | 9/2012 |
| JP | 2016-124104 A | 7/2016 |
| JP | 2018-55558 A | 4/2018 |
| JP | 2018-106652 A | 7/2018 |
| JP | 2018-129640 A | 8/2018 |
| JP | 2019-95999 A | 6/2019 |

OTHER PUBLICATIONS https://ux.stackexchange.com/questions/42840/input-field-select-multiple-items-from-a-very-large-list 2013.* http://appsso.eurostat.ec.europa.eu/nui/pages/main/demo/demo_en/html/select/tree/selected/select_icon.html.*

Stackoverflow https://stackoverflow.com/questions/12673786/how-to-select-all-checkbox-inside-a-gridview?rq=1 "How to select all checkbox inside a view" ("Stack" pp. 1-2; Oct. 2012) (Year: 2012).*

Stackexchange https://ux.stackexchange.com/questions/42840/input-field-select-multiple-items-from-a-very-large-list ("Stack-2" Figure 1; 2013) (Year: 2013).*

Office Action dated Jul. 18, 2023 issued in related JP patent application No. 2019-171723 together with English language translation.

Office Action dated Jan. 9, 2024 issued in related JP patent application No. 2019-171723 together with English language translation.

* cited by examiner

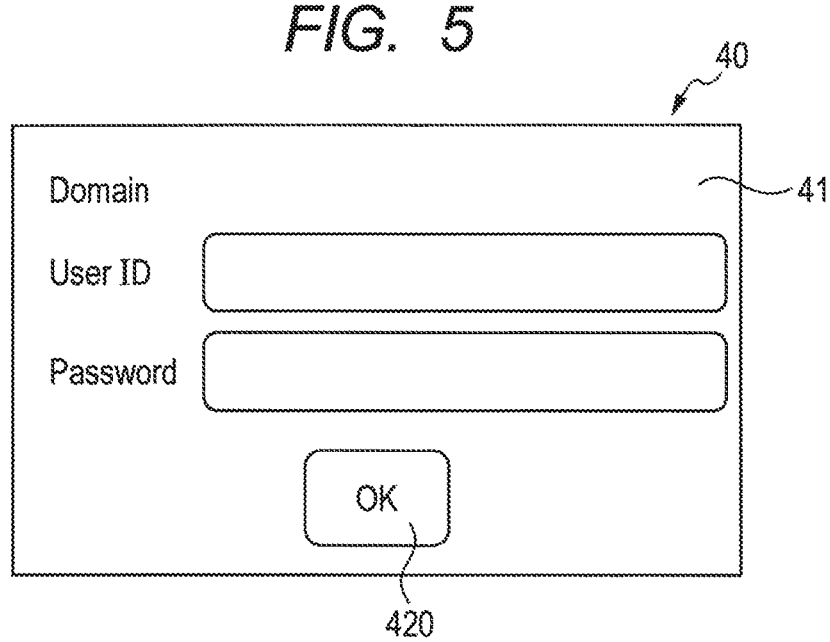

PRINTING APPARATUS

CROSS REFERENCE TO RELATED APPLICATIONS

This application claims priority from Japanese Patent Application No. 2019-171723 filed Sep. 20, 2019. The entire content of the priority application is incorporated herein by reference.

TECHNICAL FIELD

This disclosure relates to a printing apparatus.

BACKGROUND

A digital copier with an LCD display is known. In the digital copier, the stored print jobs can be displayed as a list on the LCD display. A user can select a print job listed on the LCD display and output the selected print job from the digital copier.

SUMMARY

According to one aspect, this specification discloses a printing apparatus. The printing apparatus includes a communication interface, a memory, a touch panel, a printer, and a controller. The printer is configured to print an image on a recording medium. The controller is configured to: receive a print job through the communication interface and store the print job in the memory; control the touch panel to display a list including one or more job touch keys and a function touch key, the one or more job touch keys being for individually selecting one or more print jobs stored in the memory, the function touch key being for selecting all of the one or more job touch keys included in the list, the list being scrollable along a particular direction; and in response to receiving a scroll operation of the list, controlling the touch panel to cause the list to scroll along the particular direction.

BRIEF DESCRIPTION OF THE DRAWINGS

Embodiments in accordance with this disclosure will be described in detail with reference to the following figures wherein:

FIG. 5 shows a display example of a waiting screen of the printing apparatus according to the first embodiment;

FIG. 6 shows one example of job management information stored in a memory of the printing apparatus according to the first embodiment;

DETAILED DESCRIPTION

In the digital copier, when a print job is displayed on the LCD display, touch keys for executing particular functions such as "clear", "select", "all" and "OK" are also displayed. The touch keys occupy a part of the limited display area of the LCD display. The area occupied by such touch keys becomes an obstacle in increasing the number of print jobs displayed in a list.

That is, if the area occupied by the touch keys can be reduced, the area for displaying print jobs can be increased by the reduced amount. If the area for displaying print jobs can be increased, the number of print jobs displayed in a list can be increased.

An aspect of an object of this disclosure is to provide a printing apparatus capable of increasing the area for displaying print jobs.

First Embodiment

Hereinafter, a printing apparatus according to a first embodiment of this disclosure will be described with reference to FIGS. 1 to 7.

[Configuration of Printing Apparatus]

Figure 1:
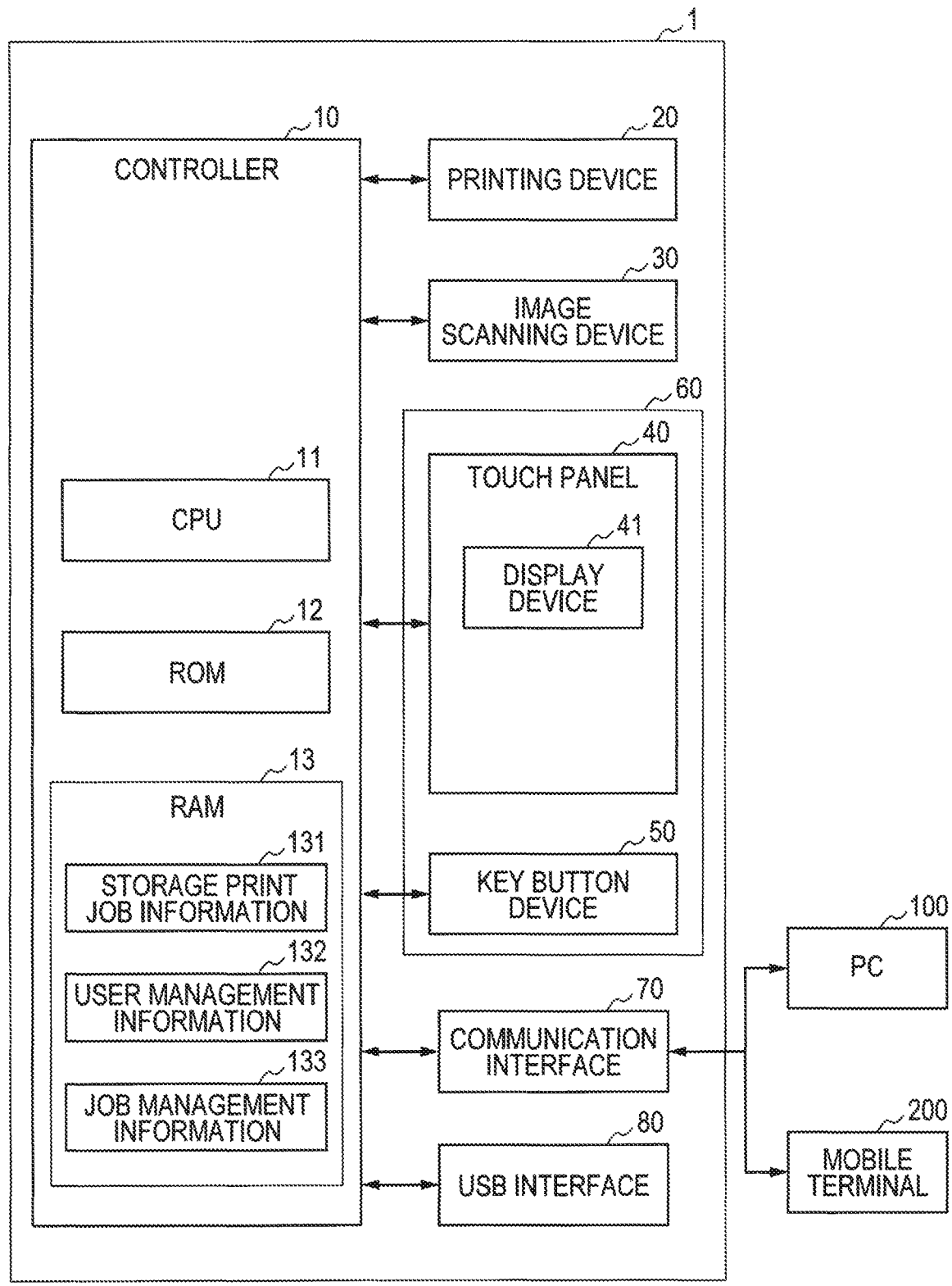
FIG. 1 is a block diagram showing the schematic configuration of a printing apparatus according to a first embodiment of this disclosure.

As shown in FIG. 1, an MFP (Multi-Function Peripheral) 1 as one example of a printing apparatus includes a controller 10, a printing device 20, an image scanning device 30, a touch panel 40, a key button device 50 including physical keys (hardware keys), a communication interface (I/F) 70, and a USB interface (UF) 80. The MFP 1 is a multifunction peripheral having a print function, a copy function, a scan function, a facsimile function, and so on.

The controller 10 performs overall controls for each unit of the MFP 1. The controller 10 includes a CPU (Central Processing Unit) 11, a ROM (Read Only Memory) 12, and a RAM (Random Access Memory) 13.

The ROM 12 stores various control programs for controlling the MFP 1, various settings, and so on. The RAM 13 as an example of a memory is used as a storage area for temporarily storing storage print job information 131, user management information 132, job management information 133 which will be described later, and image data and so on. The controller 10 controls the printing device 20 and so on based on the control program read from the ROM 12.

The printing device 20 is provided within the MFP 1. The printing device 20 prints an image on a recording medium such as a sheet by executing a print job according to a user operation received by a touch panel 40 described later. The method of image printing may be an electrophotographic method or an inkjet method. The image printed on the recording medium may be color printing or may be monochrome printing only.

The image scanning device 30 has a scan function for scanning an image. The method of image scanning (image reading) may be an ADF (Auto Document Feeder) method for reading an image while conveying a document, or may be an FB (Flat Bed) method for reading an image on a document placed on the upper surface of the contact glass.

[Setting Device]

A setting device 60 is provided on the upper surface of the MFP 1. The setting device 60 includes the touch panel 40 and the key button device 50. The touch panel 40 has a display 41 which is, for example, a liquid crystal display. The display 41 displays a waiting screen shown in FIG. 5 and a part of a list L shown in FIG. 7. The list L is formed by enumerating print job names indicating print jobs associated with a user ID (a user identifier). The display of the list L displayed on the display 41 can be scrolled along the scroll direction of the display 41 (the vertical direction in FIG. 7).

The key button device 50 has a plurality of key buttons for operating the MFP 1.

The touch panel 40 is configured to detect a pointing operation by a pointing body that touches or approaches the image display area of the display 41. That is, when a pointing operation is performed on the image display area by the pointing body, the touch panel 40 is configured to output position information indicating a pointing position which is a position where the pointing operation is performed. The touch panel 40 of the present embodiment is configured to output the position information continuously or periodically while the pointing operation is performed by the pointing body. The touch panel 40 may be configured to detect only contact as the pointing operation, may be configured to detect only proximity, or may be configured to detect both contact and proximity There are various specific modes of the pointing body for performing a pointing operation. As an example of the pointing body, a fingertip may be used, or a particular pointing device such as a stylus pen may be used.

Figure 7:
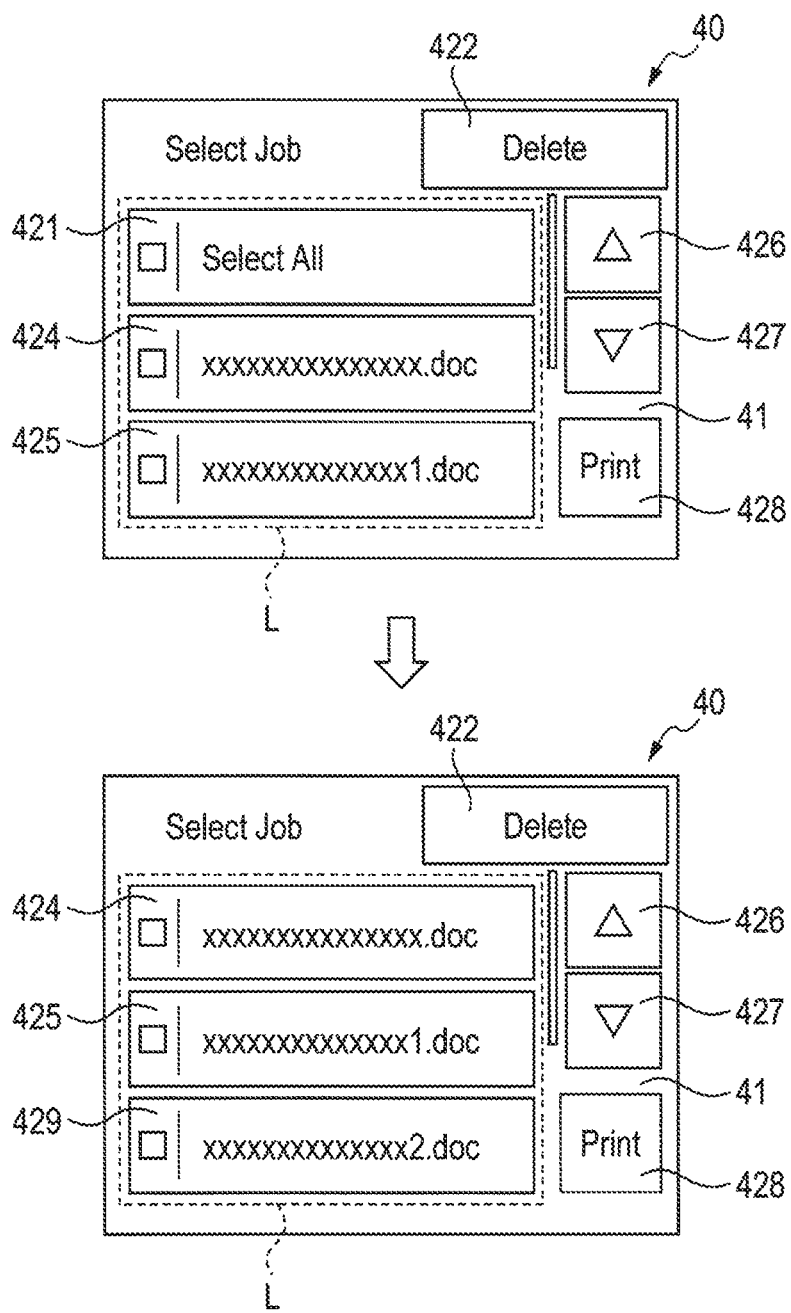
FIG. 7 shows a transition of information that is displayed on a touch panel of the printing apparatus according to the first embodiment.

The touch panel 40 displays various touch keys for executing a particular function in the image display area of the display 41. Specifically, as shown in FIGS. 5 and 7, the display 41 displays an OK key 420, a delete key 422, a select all key 421, a job touch key 424, a job touch key 425, a job touch key 429, and an up cursor key 426, a down cursor key 427, a print key 428, and so on. The select all key 421 is a function touch key having a function of selecting all the job touch keys 424, 425, and 429 listed in the list L as a particular function.

The user performs a touch operation on each touch key displayed in the image display area of the display 41. The touch panel 40 detects contact or proximity of an object to each touch key displayed in the image display area of the display 41. The touch panel 40 outputs a signal corresponding to the type of the operated touch key to the controller 10.

The communication interface 70 and the USB interface 80 are connected to the controller 10. The communication interface 70 is an interface for communication with an external apparatus. The method of communication may be a wireless communication method or a wired communication method. A PC (Personal Computer) 100 and a mobile terminal 200 as external apparatuses are electrically connected to the communication interface 70. A print job transmitted from the PC 100 and the mobile terminal 200 is inputted to the MFP 1 through the communication interface 70. The communication interface 70 is an example of a communication interface (receiver) that receives a print job.

The USB interface 80 is a device for connecting a USB device (not shown). The USB device stores, for example, printable data. The user can print the data stored in the USB device by connecting the USB device to the USB interface 80. The USB interface 80 is another example of a receiver that receives a print job.

[Storage Print Job Information Determination]

Figure 2:
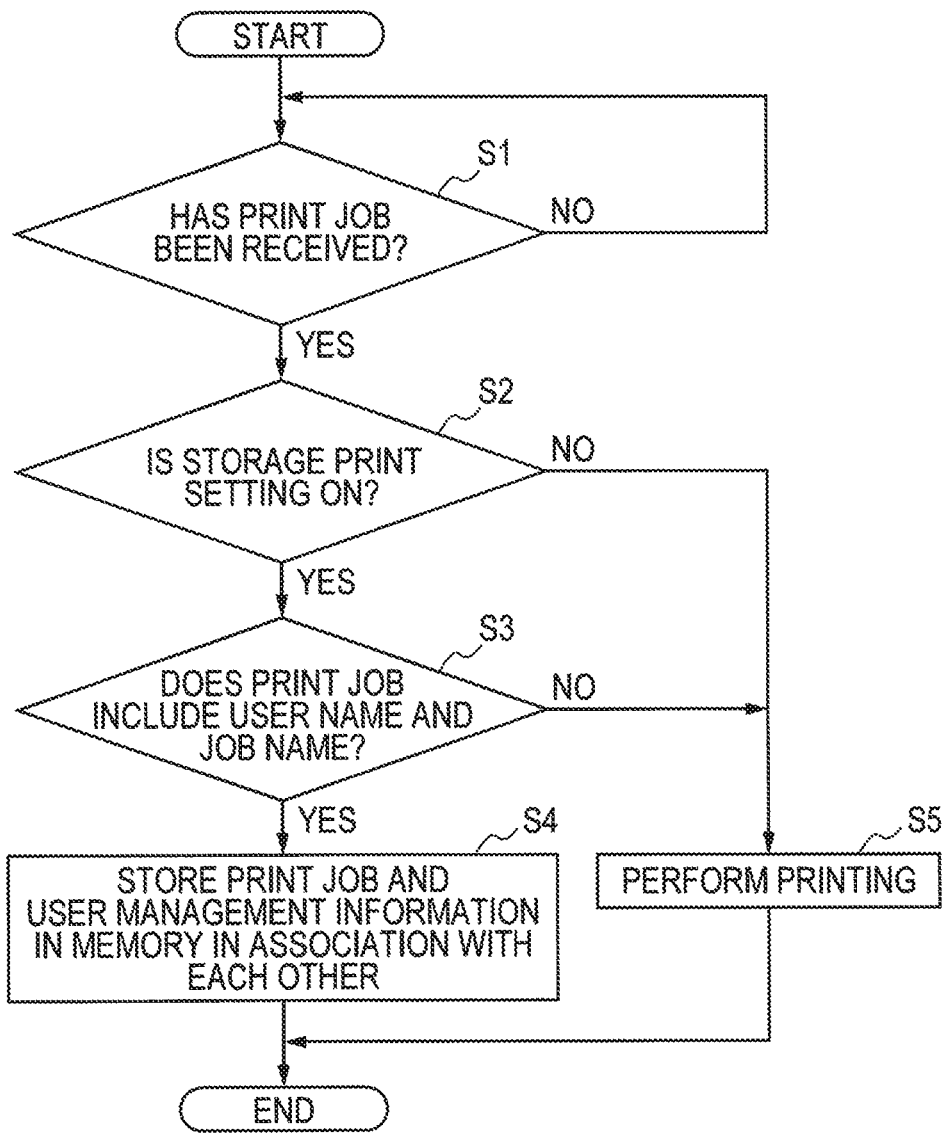
FIG. 2 is a flowchart showing storage print job information determination processing for a print job in the printing apparatus according to the first embodiment.

Storage print processing is processing in which a print job received from an external apparatus is not printed immediately, but a print job received from an external apparatus is temporarily stored in the RAM 13 and the print job is printed after login to the MFP 1. FIG. 2 shows processing of determining a setting (storage print job information) of whether the MFP 1 performs storage print processing.

Next, the flow of storage print job information determination processing by the MFP 1 of the first embodiment will be described with reference to FIG. 2. The flowchart shown in FIG. 2 is one example, and the present disclosure is not limited to this.

The controller 10 determines whether a print job has been received from an external apparatus such as the PC 100 or the mobile terminal 200 (S1). In response to determining that no print job has been received (S1: NO), the processing returns to S1. In response to determining that a print job has been received (S1: YES), the controller 10 determines whether a storage print setting is ON (S2). The "storage print setting" is a setting in which a print job is not executed immediately after the print job is received from the external apparatus but the print job is temporarily stored in the RAM 13 as storage print job information 131. The user uses the PC 100 or the setting device 60 of the MFP 1 in advance to set the storage print setting to ON or OFF. The storage print setting information is stored in a nonvolatile memory (not shown). When the storage print setting is OFF (S2:NO), the controller 10 outputs a control signal to the printing device 20 to thereby print, on a recording medium, an image of the print job received from the external apparatus using the printing device 20 (S5).

In response to determining that the storage print setting "ON" is stored in the nonvolatile memory (S2: YES), the controller 10 determines whether the print job has a user name and a job name (S3). In response to determining that the print job has a user name and a job name (S3: YES), the controller 10 stores the print job and the management information in association with each other in the RAM 13 (S4). The print job is stored in the RAM 13 in association with the storage print job information 131, the user management information 132, and the job management information 133.

FIG. 6 shows one example of the job management information 133 stored in the RAM 13. As shown in FIG. 6, the job management information 133 includes a job ID, a user ID, a job name, and ID information. In response to determining that the print job in the RAM 13 does not have a user name and a job name (S3: NO), the controller 10 outputs a control signal to the printing device 20 to thereby execute a printing operation (S5). As described above, according to the MFP 1 of this embodiment, when the storage print setting is ON (S2: YES), a print job and the job management information associated with the print job are stored in the RAM 13.

[Print Processing of Print Job]

Next, the flow of print processing of a print job by the MFP 1 of the first embodiment will be described with reference to FIGS. 3 and 4. The flowchart shown in FIGS. 3 and 4 is one example, and the present disclosure is not limited to this.

Figure 3:
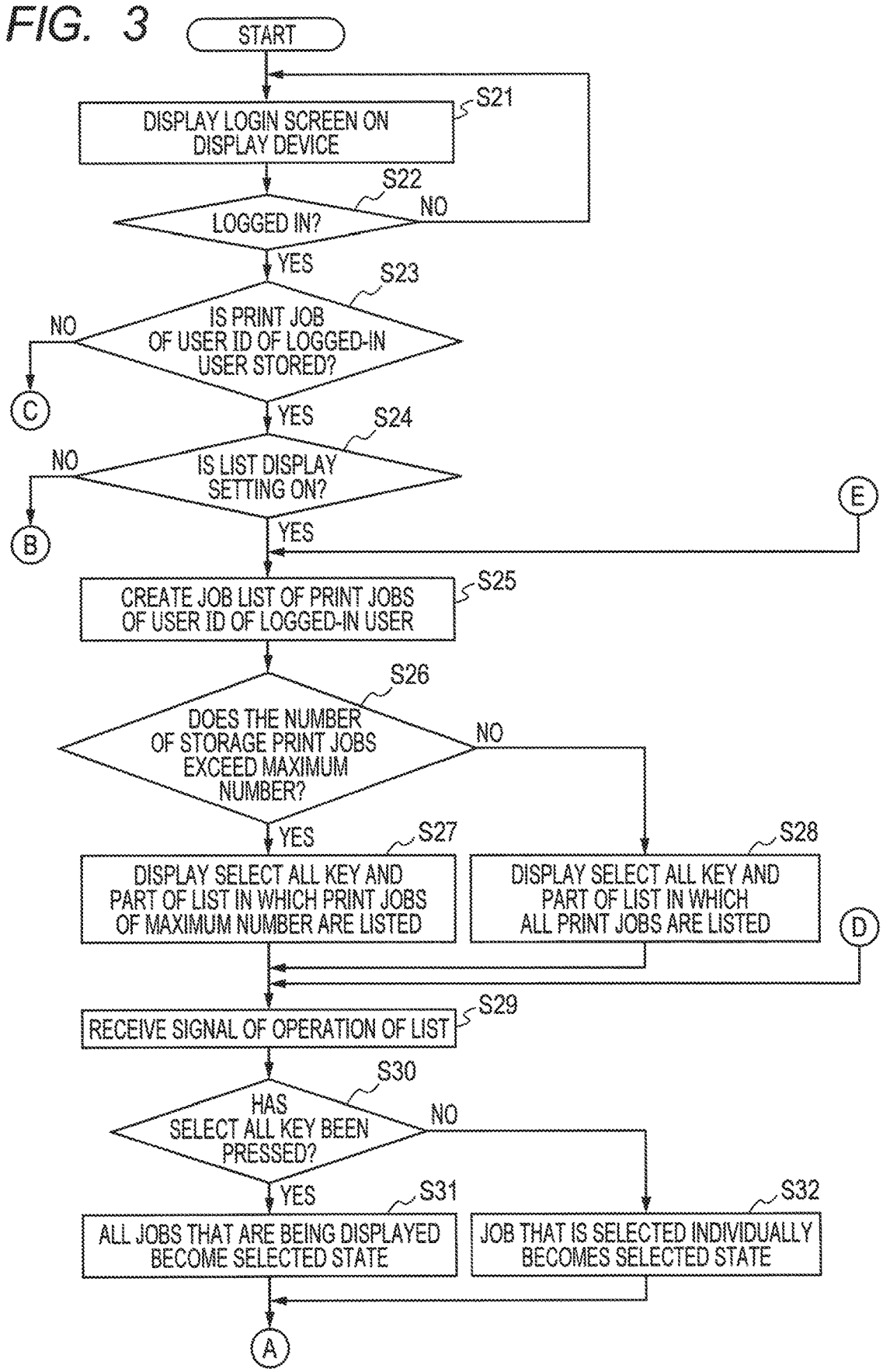
FIG. 3 is a flowchart showing a part of print processing of a print job in the printing apparatus according to the first embodiment.
Figure 4:
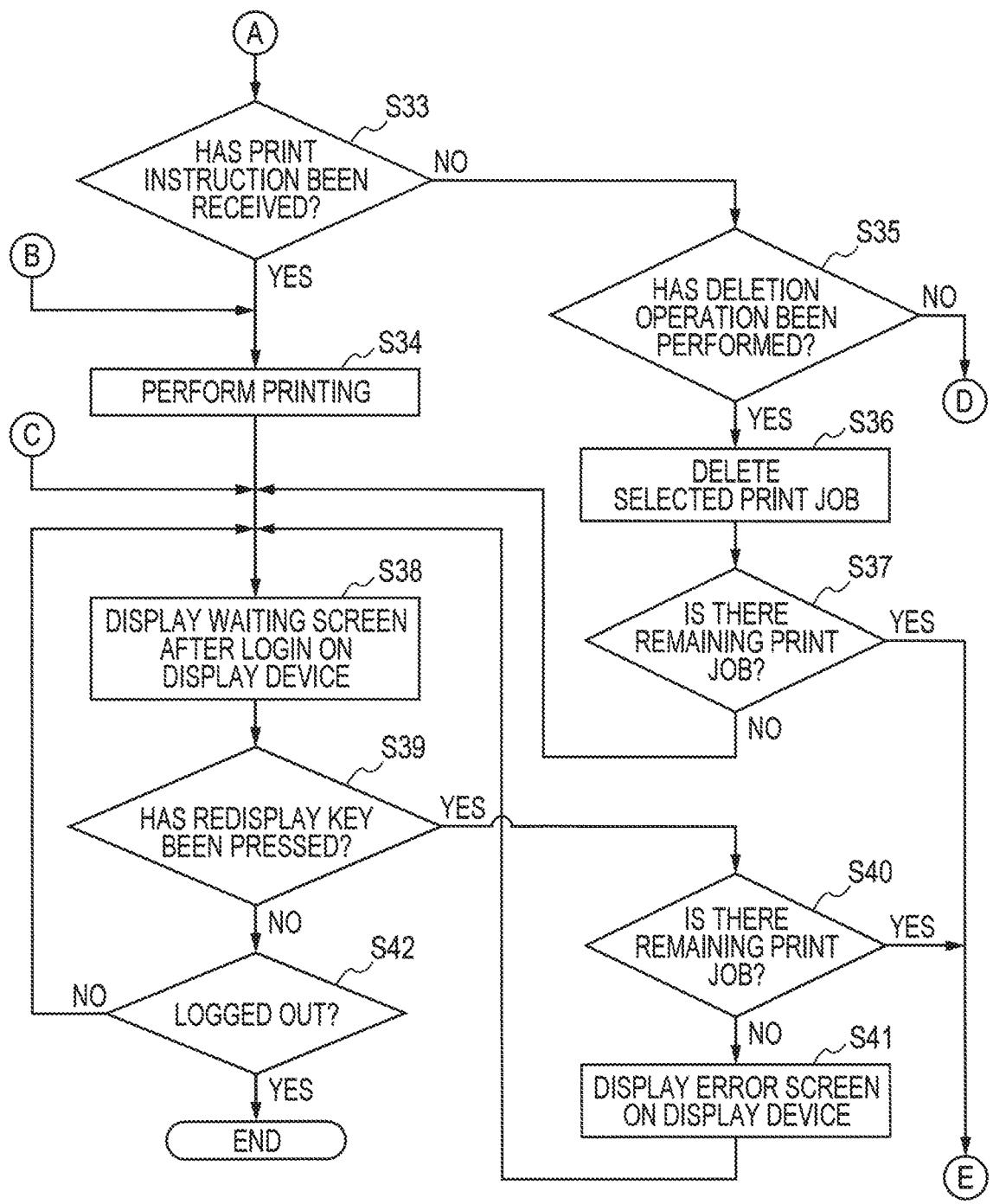
FIG. 4 is a flowchart showing the remaining part of the print processing shown in FIG. 3.

In the print processing shown in FIG. 3, the controller 10 firstly displays a waiting screen shown in FIG. 5 on the display 41 of the touch panel 40 (S21). As shown in FIG. 5, the display 41 of the touch panel 40 displays a waiting screen for allowing a user to input a user ID (a user name) and a password. The user inputs the user ID and the password through the touch panel 40 and subsequently presses the OK key 420. The controller 10 refers to the user management information 132 consisting of the user ID and the password to determine whether the inputted user ID and password match the user management information 132, thereby determining whether the user has logged in (S22). When the inputted user ID and password match the user management information 132, the controller 10 determines that the user authentication is successful.

The MFP 1 permits the use of the apparatus based on the authority given to the logged-in user. On the other hand, when the user authentication is not successful, the MFP 1 determines that a waiting screen has failed and does not permit the use of the apparatus.

In response to determining that the user authentication is not successful (that is, when no waiting screen is performed) (S22: NO), the controller 10 returns to S21. In response to determining that the user authentication is successful (that is, when a waiting screen is performed) (S22: YES), the controller 10 determines whether a print job of the user ID of the logged-in user is stored in the RAM 13 (S23). In response to determining that a print job of the user ID of the logged-in user is stored in the RAM 13 (S23: YES), the controller 10 determines whether a list display setting is ON (S24). In response to determining that no print job of the user is stored in the RAM 13 (S23: NO), the controller 10 proceeds to S38 described later.

The "list display setting" is a setting of whether the list L is to be displayed on the display 41 of the touch panel 40. The user preliminarily sets the list display setting to ON or OFF on the PC 100 or the setting device 60 of the MFP 1. The information on the list display setting is stored in a nonvolatile memory (not shown).

In response to determining that the list display setting is ON (S24: YES), the controller 10 creates the job list of the print jobs of the user ID of the logged-in user (S25) and determines whether the number of stored print jobs exceeds a maximum number (S26). The maximum number is the number of print jobs which can be set in the list L and is "32", for example. In response to determining that the list display setting is OFF (S24: NO), the controller 10 proceeds to S34 described later. In this case, the controller 10 executes all the print jobs stored in the RAM 13 to print images corresponding to all the print jobs.

In response to determining that the number of the stored print jobs exceeds the maximum number (for example, "32") (S26: YES), the controller 10 sets, to the list L, the select all key 421 shown in FIG. 7 and a list of print jobs of the maximum number of print jobs from among all the print jobs of the user ID of the logged-in user. The controller 10 controls the display 41 to display the select all key 421 forming a part of the list L and the job touch keys 424 and 425 in the list L, as an initial state. Specifically, the controller 10 controls the display 41 to display the select all key 421 and a part of the list L including the list of the print jobs of the maximum number (S27). In response to determining that the number of the stored print jobs does not exceed the maximum number (S26: NO), the controller 10 sets, to the list L, the select all key 421 and all the print jobs of the user ID of the logged-in user and displays a part of the list L on the display 41. Specifically, the controller 10 controls the display 41 to display the select all key 421 and a part of the list L including the list of all the print jobs (S28).

The user operates the touch panel 40 shown in FIG. 7 to thereby select a desired print job. Specifically, when the user scrolls the list L, the controller 10 controls the display 41 of the touch panel 40 to display a circularly-linked list L connecting the first row and the final row in a circularly-linked form. The user can visually check the job touch keys 424, 425, and 429 listed on the list L and subsequently operate the select all key 421 shown in the upper diagram of FIG. 7 to thereby select the maximum number of print jobs or all the print jobs. The user can operate the up cursor key 426 and the down cursor key 427 to scroll the list L in the scroll direction (the vertical direction in FIG. 7) and select only the desired print job.

After S27 or S28, in response to the user's operation on the touch panel 40, the controller 10 receives an operation signal regarding a list operation. In response to receiving the list operation signal (S29), the controller 10 determines whether the user has pressed the select all key 421 (S30). In response to determining that the user has pressed the select all key 421 (S30: YES), all the jobs displayed on the display 41 become a selected state (S31). In response to determining that the user has not pressed the select all key 421 (S30: NO), the job which is individually selected by the user becomes a selected state (S32).

After S31 or S32, the controller 10 determines whether a print instruction has been given (S33). Specifically, when the user presses the print key 428, the operation signal of the print key 428 is inputted to the controller 10. The controller 10 determines whether the operation signal of the print key 428 has been received and thereby determines whether a print instruction has been given. In response to determining that a print instruction has been given (S33: YES), the controller 10 controls the printing device 20 to perform printing (S34). In response to determining that there is no print instruction (S33: NO), the controller 10 determines whether the user has pressed the delete key 422 of the touch panel 40 (S35).

In response to determining that the user has not pressed the delete key 422 (S35: NO), the processing returns to S29. In response to determining that the user has pressed the delete key 422 (S35: YES), the controller 10 deletes the selected print job from the RAM 13 (S36). Then, the controller 10 determines whether there is a remaining print job (S37). In response to determining that there is a remaining print job (S37: YES), the processing returns to S25. In S25, the controller 10 recreates (updates) the job list of print jobs while excluding any printed job and deleted job. Subsequently, the processing in S26 and thereafter is executed again. That is, in a case where the original number of print jobs is smaller than or equal to the maximum number or where the original number of print jobs exceeds the maximum number but the number of print jobs becomes smaller than or equal to the maximum number after the printed job and the deleted job are excluded, determination in S26 by the controller 10 is negative (S26: NO) and the controller 10 controls the display 41 of the touch panel 40 to display job touch keys corresponding to all the print jobs that are still stored in the RAM 13 (S28). In a case where the original number of print jobs exceeds the maximum number and the number of print jobs still exceeds the maximum number after the printed job and the deleted job are excluded, determination in S26 by the controller 10 is affirmative (S26: YES) and the controller 10 controls the display 41 of the touch panel 40 to display job touch keys corresponding to the maximum number of print jobs from among all the print jobs that are still stored in the RAM 13 (S27). In response to determining that there is no remaining print job (S37: NO), the processing proceeds to S38.

The controller 10 controls the display 41 to display a waiting screen that is displayed after the waiting screen operation (S38) and determines whether there has been an input operation of a redisplay key (not shown) displayed in the waiting screen (S39). In response to determining that there has been an operation input of a redisplay key (S39: YES), the controller 10 determines whether there is a remaining print job (S40). In response to determining that there is a remaining print job (S40: YES), the processing returns to S25. The processing in S25 and thereafter is the same as the above. In response to determining that there is no remaining print job (S40: NO), the controller 10 controls the display 41 to display an error screen (S41).

In response to determining that there is no input operation of the redisplay key (S39: NO), the controller 10 determines whether the user has logged out (S42). In response to determining that the user has not logged out (S42: NO), the processing returns to S38. In response to determining that the user has logged out (S42: YES), the print processing is completed.

According to the MFP 1 of the first embodiment described above, the select all key 421 which is a function touch key conventionally always displayed to occupy a part of the display area of the display 41 functions as one item constituting the scrollable list L, and thus the select all key 421 is selectively displayed or not displayed on the display 41 by the scroll operation of a user. Thus, the job touch keys 424, 425, and 429 can also be displayed in the area conventionally occupied by the select all key 421, thereby increasing the area for displaying the job touch keys 424, 425, and 429.

Further, the select all key 421 need not be always displayed on the display 41. Thus, another key (for example, the job touch key 429) can be displayed in the saved area corresponding to the select all key 421. Further, because the select all key 421 need not be always displayed on the display 41, the display 41 can be downsized.

According to the MFP 1 of the first embodiment, in a case where the number of the print jobs exceeds the maximum number of print jobs that can be included in the list L, the print jobs not included in the list L can be newly displayed, thereby improving user convenience. Further, when the list L is displayed on the display 41, the print jobs still stored in the RAM 13 among the print jobs included in the recently-displayed list L can be newly displayed, thereby improving user convenience. Further, according to the MFP 1 of the first embodiment (specifically, the processing in S24), the user can switch whether the list relating to print jobs is displayed on the touch panel 40 or all the print jobs are executed to cause the printing device 20 to print images of all the print jobs, thereby improving user convenience.

Second Embodiment

Next, the MFP 1 in a second embodiment of the present disclosure will be described with reference to FIGS. 8 to 10. For convenience of description, members having the same functions as the members described in the first embodiment will be designated by the same reference numerals, and the description thereof will not be repeated. In the MFP 1 of the second embodiment, the configuration of a setting device 60A and the flow of print processing of a print job are different from those of the first embodiment.

[Setting Device]

Figure 9:
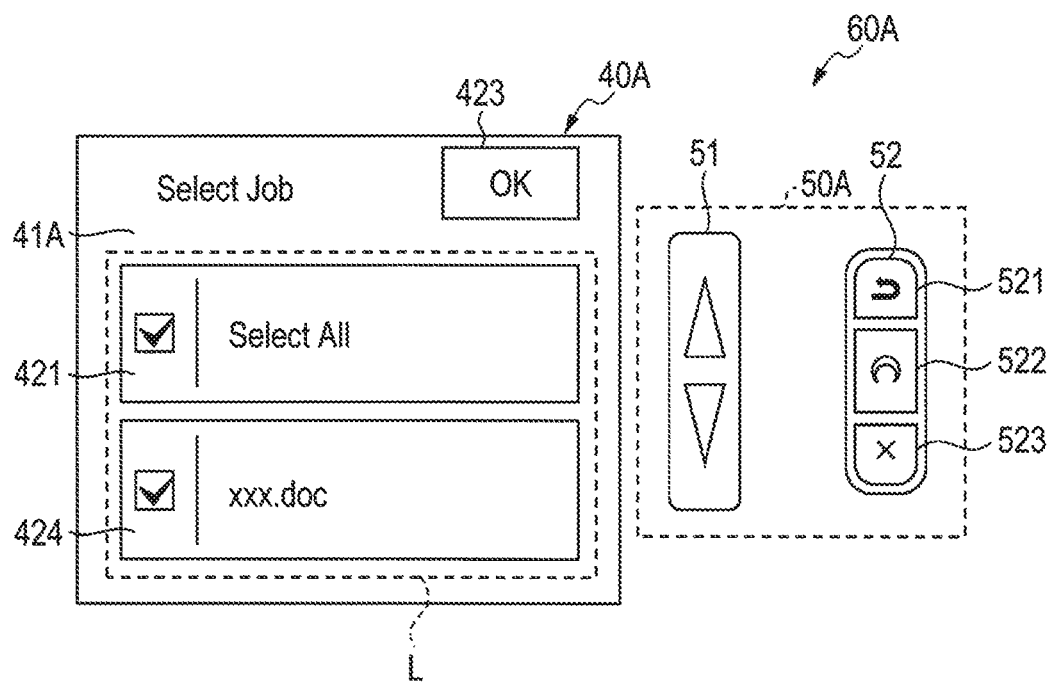
FIG. 9 shows the configuration of a setting device of the printing apparatus according to the second embodiment.

FIG. 9 shows the configuration of the setting device 60A of the MFP 1 in the second embodiment. As shown in FIG. 9, a touch panel 40A includes an OK key 423, the select all key 421, and the job touch key 424, and so on. The respective job touch keys correspond to print jobs extracted from the RAM 13. In the display 41A, the storage print job information 131 (specifically, the file name) relating to each print job is displayed within the corresponding job touch key. A key button 50A which is a physical key (hardware key) is displayed at the right side of the display 41A. The key button 50A includes a cursor button 51 and an operation button group 52. The operation button group 52 includes a return button 521, a sleep button 522, a close button 523, and so on.

[Print Processing of Print Job]

Next, the flow of print processing of a print job by the MFP 1 of the second embodiment will be described with reference to FIG. 8. The flowchart shown in FIG. 8 is one example, and the present disclosure is not limited to this.

Figure 8:
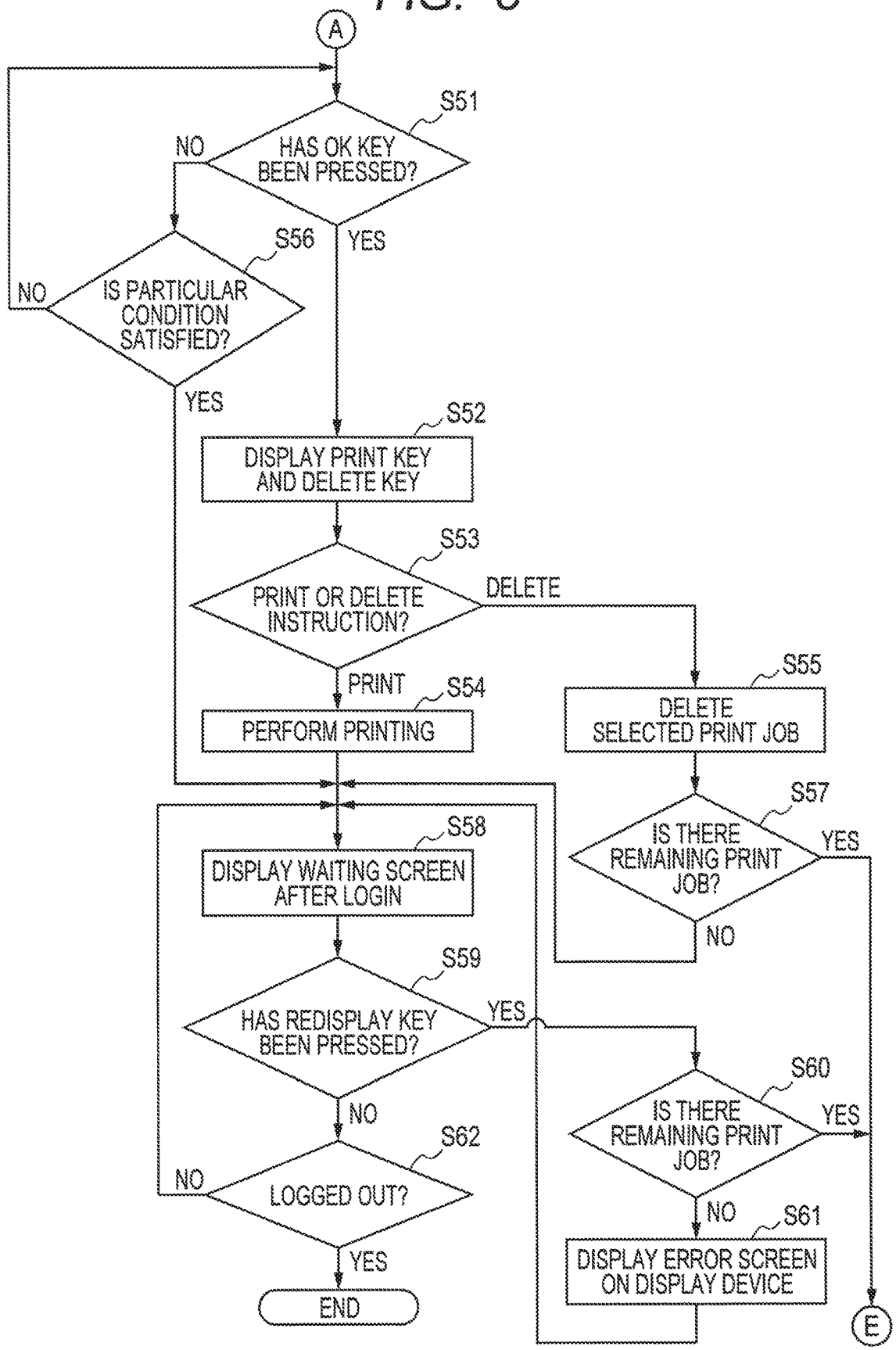
FIG. 8 is a flowchart showing print processing in a printing apparatus according to a second embodiment of this disclosure.

In the print processing of the second embodiment shown in FIG. 8, the processing from S21 to S32 of the flow chart shown in FIG. 3 is performed in the same manner as the first embodiment. Here, the description of the processing of S21 to S32 is omitted. In the second embodiment, the processing of S51 to S62 is different from the print processing of a print job in the first embodiment.

In the second embodiment, the controller 10 determines whether the user has pressed the OK key 423 of the touch panel 40A (see FIG. 9) (SM). In response to determining that the user has pressed the OK key 423 (SM: YES), the controller 10 displays the print key 428 and the delete key 422 on the display 41A of the touch panel 40A as shown in FIG. 10 (S52). Specifically, when the user presses the OK key 423, the display on the display 41A of the touch panel 40A is switched from the display screen shown in FIG. 9 to the display screen shown in FIG. 10. The user determines whether to print or delete the print job selected in S31 or S32 of FIG. 3 by operating the print key 428 or the delete key 422 on the display screen shown in FIG. 10.

In response to the user's operation on the print key 428 or the delete key 422, an instruction signal according to the operation is outputted to the controller 10. The controller 10 receives the instruction signal to thereby determine whether a "print" or "delete" instruction has been given (S53). In response to determining that the "print" instruction has been given (S53: print), the controller 10 controls the printing device 20 to perform printing of the selected print job (S54). In response to determining that the "delete" instruction has been given (S53: delete), the controller 10 deletes the selected print job from the RAM 13 (S55) and determines whether a remaining print job is stored in the RAM 13 (that is, whether there is a remaining print job in the RAM 13) (S57). In response to determining that there is a remaining print job in the RAM 13 (S57: YES), the processing returns to S25. In S25, the controller 10 recreates (updates) the job list of print jobs while excluding any printed job and deleted job. Subsequently, the processing in S26 and thereafter is executed again. That is, in a case where the original number of print jobs is smaller than or equal to the maximum number or where the original number of print jobs exceeds the maximum number but the number of print jobs becomes smaller than or equal to the maximum number after the printed job and the deleted job are excluded, determination in S26 by the controller 10 is negative (S26: NO) and the controller 10 controls the display 41 of the touch panel 40 to display job touch keys corresponding to all the print jobs that are still stored in the RAM 13 (S28). In a case where the original number of print jobs exceeds the maximum number and the number of print jobs still exceeds the maximum number after the printed job and the deleted job are excluded, determination in S26 by the controller 10 is affirmative (S26: YES) and the controller 10 controls the display 41 of the touch panel 40 to display job touch keys corresponding to the maximum number of print jobs from among all the print jobs that are still stored in the RAM 13 (S27). In response to determining that there is no remaining print job (S57: NO), the processing proceeds to S58 described later.

In response to determining that the OK key 423 of the touch panel 40 has not been pressed (S51: NO), the controller 10 determines whether a particular condition is satisfied (S56). The particular condition includes an elapse of a certain time or longer and a press of the close button 523 shown in FIG. 9 or a home button (not shown), and so on. In response to determining that the particular condition is satisfied (S56: YES), the processing proceeds to S58. In response to determining that the particular condition is not satisfied (S56: NO), the processing returns to S51.

Next, the controller 10 controls the display 41A to display the waiting screen that is displayed after login (S58) and determines whether the redisplay key has been pressed (S59). In response to determining that the redisplay key has been pressed (S59: YES), the controller 10 determines whether there is a remaining print job (S60). In response to determining that there is a remaining print job (S60: YES), the processing returns to S25. The processing in S25 and thereafter is the same as the above. In response to determining that there is no remaining print job (S60: NO), the controller 10 controls the display 41A to display the error screen (S61) and the processing returns to S58.

In response to determining that the redisplay key has not been pressed (S59: NO), the controller 10 determines whether the user has logged out (S62). In response to determining that the user has not logged out (S62: NO), the processing returns to S58. In response to determining that the user has logged out (S62: YES), the print processing is completed.

The MFP 1 of the second embodiment described above provides similar effects to the first embodiment. In particular, in the second embodiment, the setting device 60A is provided with the cursor button 51 which is a physical key to receive an operation to scroll the list L, and thus there is no need to display a cursor key in the display 41A. Thus, the display area of the display 41A can be increased by the area of the cursor key.

In the MFP 1 of the second embodiment, when the number of the print jobs exceeds the maximum number of print jobs that can be included in the list L, the print jobs not included in the list L can be newly displayed, thus improving user convenience. Further, when the list L is displayed on the display 41A, the print jobs still stored in the RAM 13 can be newly displayed from among the print jobs included in the recently-displayed list L, thus improving user convenience.

Figure 10:
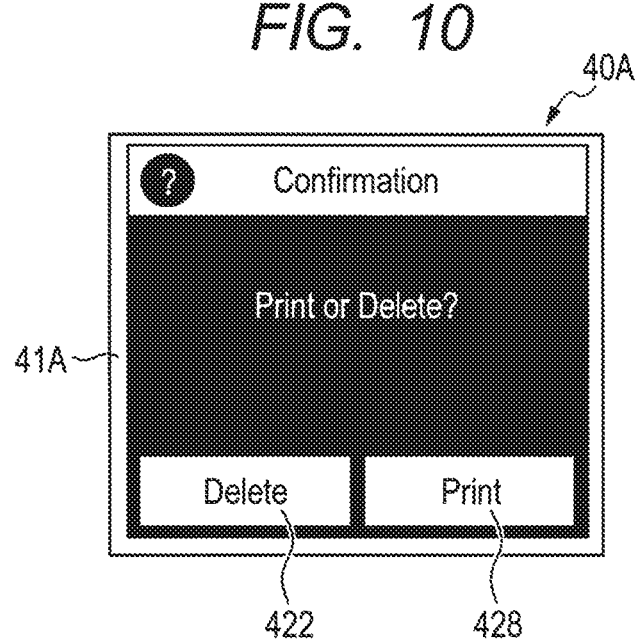
FIG. 10 shows a display screen after switching of a touch panel of the printing apparatus according to the second embodiment.

In the second embodiment, when the OK key 423 shown in FIG. 9 is pressed, the screen display is switched to the screen display shown in FIG. 10 through which the user selects "delete" or "print". Thus, there is no need to display the delete key 422 or the print key 428 on the display 41A, unlike FIG. 7. This increases the number of display areas in the list L in the display 41A.

[Modification]

While the disclosure has been described in detail with reference to the above aspects thereof, it would be apparent to those skilled in the art that various changes and modifications may be made therein without departing from the scope of the claims.

In the first embodiment, as shown in the upper diagram of FIG. 7, the controller 10 controls the display 41 to circularly display the list L in which the select all key 421 is arranged in the first row and the job touch keys 424 and 425 are arranged in the second row to the final row. However, the present disclosure is not limited to this.

For example, the controller 10 may control the display 41 to display the list L in a non-circular manner. In this case, the controller 10 controls the display 41 to display the list L in which the select all key 421 is arranged in both the first row and the final row, and the job touch keys 424 and 425 are sequentially arranged in the rows other than the rows in which the select all key 421 is arranged. The controller 10 allows the list L to be scrolled until the first row is displayed at the top in the scroll direction in the display 41 or until the final row is displayed at the end in the scroll direction in the display 41. According to this configuration, the user scrolls the list L until the first row is displayed at the top in the scroll direction in the display 41 or until the final row is displayed at the end in the scroll direction in the display 41. Thus, the user can select the select all key 421 and the job touch keys 424 and 425 in a favorable manner.

In the first embodiment, as shown in FIG. 7, the up cursor key 426 and the down cursor key 427 are provided at the right side of the list L including the select all key 421, the job touch key 424, the job touch key 425, and so on. However, the present disclosure is not limited to this. For example, without providing the up cursor key 426 and the down cursor key 427, the list L on the touch panel 40 may be scrolled in the up and down directions so that the job list is circularly displayed. That is, the list L may be scrolled in the up and down directions in response to a sliding operation (touch or proximity) on the list L by a pointing body such as a fingertip or a stylus pen.

The present disclosure is not limited to the above-described embodiments, but various modifications can be made within the scope of the claims, and embodiments obtained by appropriately combining the technical features disclosed in the different embodiments are also included in the scope of the present disclosure.

What is claimed is:

1. A printing apparatus comprising:
   a communication interface;
   a memory;
   a touch panel;
   a printer configured to print an image on a recording medium;
   a list scroll key; and
   a controller configured to:
      receive a print job through the communication interface and store the print job in the memory;
      control the touch panel to display a list including one or more job touch keys and a function touch key, the one or more job touch keys displaying, on the touch panel, print job names indicating one or more print jobs stored in the memory, the function touch key displaying, on the touch panel, an indication of a select-all function for selecting all of the one or more job touch keys included in the list, the list being scrollable along a particular direction, the function touch key being displayed as one item constituting the scrollable list; and
      in response to receiving a scroll operation of the list, controlling the touch panel to cause the list to scroll along the particular direction,
   wherein the controller is configured to determine whether a number of the one or more print jobs stored in the memory exceeds a maximum number, the maximum number being the maximum number of job touch keys which can be set in the list;
      wherein in response to determining that the number of the stored print jobs exceeds the maximum number, set to the list the function touch key and the maximum number of job touch keys;
      wherein in response to determining that the number of the stored print jobs does not exceed the maximum number, set to the list the function touch key and the number of job touch keys equal to the number of the stored print jobs;

wherein the controller is configured to, at an initial display of a display area of the list on the touch panel, control the touch panel to display the function touch key only in a first row of the list and to display the one or more job touch keys in all rows other than the first row;

wherein the list scroll key is an up arrow key indicating a direction from a final row toward the first row of the list or a down arrow key indicating a direction from the first row toward the final row of the list; and wherein the controller is configured to, in response to receiving an operation of the list scroll key once, control the touch panel to scroll the list by an amount corresponding to one item of the scrollable list in the direction from the final row toward the first row, thereby changing from a first state where the function touch key is displayed in the display area of the list to a second state where the function touch key is not displayed in the display area of the list and the one or more job touch keys are displayed in all rows of the list.

2. The printing apparatus according to claim 1, wherein the controller is configured to:
in response to detecting, through the touch panel, contact or proximity of an object to one of the one or more job touch keys displayed on the touch panel, select a print job associated with the one of the one or more job touch keys; and
control the printer to execute the selected print job; and
wherein the controller is configured to:
in response to detecting, through the touch panel, contact or proximity of an object to the function touch key displayed on the touch panel, select all of the one or more print jobs stored in the memory; and
control the printer to execute all of the one or more print jobs stored in the memory.

3. The printing apparatus according to claim 1, wherein the controller is configured to control the touch panel to display the list in a circularly-linked form connecting the first row and the final row.

4. The printing apparatus according to claim 1, wherein the function touch key is arranged in at least one of the first row and a final row of the list, and the one or more job touch keys are sequentially arranged in rows other than a row in which the function touch key is arranged; and
wherein the controller is configured to cause the list to scroll until the first row is displayed at a top in the particular direction on the touch panel or until the final row is displayed at an end in the particular direction on the touch panel.

5. The printing apparatus according to claim 1, wherein the touch panel is configured to receive the scroll operation of the list.

6. The printing apparatus according to claim 1, wherein the list scroll key is a physical key configured to receive the scroll operation of the list.

7. The printing apparatus according to claim 1, wherein the controller is configured to switch a setting of whether to:
control the touch panel to display the list relating to the one or more print jobs stored in the memory; or
execute all of the one or more print jobs stored in the memory to control the printer to print images relating to all of the one or more print jobs.

8. The printing apparatus according to claim 1, wherein the controller is configured to:
when updating the list displayed on the touch panel, display a list including one or more job touch keys for individually selecting one or more print jobs that are still stored in the memory from among the one or more job touch keys included in the list displayed most recently.

9. The printing apparatus according to claim 1, wherein the controller is configured to:
when updating the list displayed on the touch panel, display a list including one or more job touch keys for individually selecting one or more print jobs that are still stored in the memory, the one or more job touch keys being not included in the list displayed most recently because a number of print jobs associated with a same user ID exceeds a maximum number of job touch keys that can be included in the list.

10. The printing apparatus according to claim 1, wherein the controller is configured to:
control the touch panel to display the list scroll key for scrolling the list along the particular direction; or
control the touch panel to scroll the list in response to a sliding operation on the list along the particular direction by a pointing body.

11. The printing apparatus according to claim 1, wherein the controller is configured to:
control the touch panel to display the list in a non-circular manner that the function touch key is arranged in both the first row and a final row in the list and that the one or more job touch keys are sequentially arranged in rows other than the rows in which the function touch key is arranged.

12. The printing apparatus according to claim 1, wherein the controller is configured to:
after at least one of the one or more print jobs is printed or deleted, update remaining print jobs while excluding a printed or deleted print job;
determine whether a number of the remaining print jobs exceeds a maximum number;
in response to determining that the number of the remaining print jobs does not exceed the maximum number, control the touch panel to display job touch keys for individually selecting all the remaining print jobs; and
in response to determining that the number of the remaining print jobs exceeds the maximum number, control the touch panel to display job touch keys for individually selecting the maximum number of print jobs from among all the remaining print jobs.

13. The printing apparatus according to claim 1, wherein the controller is configured to:
display a particular key on a first screen showing the list including the one or more job touch keys and the function touch key, the particular key being a key for switching from the first screen to a second screen in a state where at least one of the one or more job touch keys and the function touch key is selected; and
in response to an operation on the particular key on the first screen, switch to the second screen on which a print key and a delete key are shown, the print key being a key for executing a print job associated with a selected one of the one or more job touch keys and the function touch key, the delete key being a key for deleting the print job associated with the selected one of the one or more job touch keys and the function touch key.

14. The printing apparatus according to claim 1, wherein the function touch key and each of the one or more job touch keys have a same size.

15. The printing apparatus according to claim 14, wherein a first distance between adjacent ones of the one or more job touch keys is equal to a second distance between the function touch key and a closest job touch key, the closest job touch key being one of the one or more job touch keys which is closest to the function touch key.

16. The printing apparatus according to claim 14, wherein each of the one or more job touch keys has a frame surrounding characters indicating the print job;
   wherein the function touch key has a frame surrounding characters indicating a function of selecting all of the one or more job touch keys; and
   wherein the frame of each of the one or more job touch keys and the frame of the function touch key have a same size.

17. The printing apparatus according to claim 15, wherein the controller is configured to control the touch panel such that, in response to the scroll operation of the list, the function touch key for selecting all of the one or more job touch keys is displayed and hidden on the touch panel.

18. A printing apparatus comprising:
   a communication interface;
   a memory;
   a touch panel;
   a printer configured to print an image on a recording medium; and
   a controller configured to:
      receive a print job through the communication interface and store the print job in the memory; and
      control the touch panel to display a scroll display area and a non-scroll display area different from the scroll display area,
   the scroll display area displaying a list in a scrollable manner, the list including a plurality of print job names indicating a plurality of print jobs and an indication of a select-all function for selecting all of the plurality of print jobs stored in the memory,
   the non-scroll display area displaying a list scroll key for scrolling the list in a particular direction and a print key for executing print jobs,
   wherein the controller is configured to determine whether a number of the plurality of print jobs stored in the memory exceeds a maximum number, the maximum number being the maximum number of job touch keys which can be set in the list, the job touch keys being keys indicating print jobs;
      wherein in response to determining that the number of the stored print jobs exceeds the maximum number, set to the list a function touch key and the maximum number of job touch keys, the function touch key being a key indicating the select-all function; and
      wherein in response to determining that the number of the stored print jobs does not exceed the maximum number, set to the list the function touch key and the number of job touch keys equal to the number of the stored print jobs.

19. The printing apparatus according to claim 18, wherein the controller is configured to:
   in response to detecting, through the touch panel, contact or proximity of an object to one of the plurality of print job names displayed on the touch panel, select a print job associated with the one of the plurality of print job names; and
   control the printer to execute the selected print job; and
wherein the controller is configured to:
   in response to detecting, through the touch panel, contact or proximity of an object to the indication of the select-all function displayed on the touch panel, select all of the plurality of print jobs stored in the memory; and
   control the printer to execute all of the plurality of print jobs stored in the memory.

* * * * *